US006427090B1

(12) United States Patent
Federico et al.

(10) Patent No.: US 6,427,090 B1
(45) Date of Patent: Jul. 30, 2002

(54) REQUALIFICATION CONTROLLER FOR DURABLES

(75) Inventors: John T. Federico, Wappingers Falls; Perry G. Hartswick, Millbrook; Alan C. Thomas, Hughsonville; Anne Marie Pelella, Wappingers Falls, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/376,943

(22) Filed: Aug. 18, 1999

(51) Int. Cl.[7] .............................................. G06F 19/00
(52) U.S. Cl. ....................................... 700/100; 700/164
(58) Field of Search ................................ 700/105, 108, 700/109, 110, 174, 175, 169, 100, 101; 702/34, 82, 83, 84; 73/104

(56) References Cited

U.S. PATENT DOCUMENTS 4,090,403 A * 5/1978 Tsukada et al. ............... 70/104
4,207,567 A * 6/1980 Juengel et al. ................. 73/104
4,351,029 A * 9/1982 Maxey et al. ................. 702/82
6,182,049 B1 * 1/2001 Barker et al. ................. 702/82

* cited by examiner

Primary Examiner—Leo Picard
Assistant Examiner—Kidest Bahta
(74) Attorney, Agent, or Firm—Jay H. Anderson; Friedman Siegelbaum LLP

(57) ABSTRACT

A system is provided for controlling the time at which a durable item, such as a reticle used in a lithography process in semiconductor manufacturing, is requalified for use. A counting device counts occurrences of predefined events, such as the number of jobs in which the reticle is used or the number of times it is placed in a lithography tool. The reticle is not removed from use until a limiting number of jobs or tool placements is reached, or the reticle is needed for processing the requalification job. The system also includes a requalification device for the durable item.

18 Claims, 2 Drawing Sheets

REQUALIFICATION CONTROLLER FOR DURABLES

FIELD OF THE INVENTION

This invention relates to a system for controlling the time at which a durable item used in a manufacturing process is requalified for use and particularly to such a system in which the time at which such durable item is requalified is determined by the occurrence of one or more of a predetermined number of definable events.

BACKGROUND OF THE INVENTION

Within manufacturing environments today, durable items (that is, resources that are reused during the manufacturing process) are key elements in the production process. These durable items are subject to damage during use and, therefore, it has become the practice to requalify such durable items at specific time intervals.

A specific example of such a durable item would be a photomask (called a reticle) which is used in a lithography tool of a semi-conductor manufacturing facility. For the case of reticles, a requalification is typically initiated at a predetermined time interval after its introduction into the manufacturing process to ensure that the reticle is viable for use in the process. This requalification process typically has overhead associated with it, which means that the lithography tool is used for requalification rather than making product during requalification. This conventional method of requalification results in the reticle being removed from the production process after its expiration time, and is thus unavailable for use in manufacturing for the entire lifetime of the requalification job.

SUMMARY OF THE INVENTION

In accordance with the present invention, requalification of a durable item used in a manufacturing process is initiated prior to the durable item's expiration. The system of this invention includes a first counter for counting the occurrences of first events to provide a first counter count, a device for determining if the first counter count exceeds a warning level, a device for determining if said first counter count is less than a limit level and a requalification device for initiating requalification of said durable item when the warning level is reached, but before the limit level is reached.

In a preferred embodiment of this invention the system also includes an apparatus for using the durable item in the manufacturing process and apparatus for determining if the durable item is fit for further use. In a further embodiment, the system also includes an apparatus, responsive to a determination that the durable item is fit for use, for resetting the first counter.

The system can also be used if the durable item also expires after a second predetermined number of second events. In such circumstances the system also includes a second counter for counting the occurrences of the second events to provide a second counter count; a device for determining if the second counter count exceeds a second warning level; a device for determining if the second counter count is less than a second limit level; and the requalification device also initiates requalification of the durable item when the warning level is reached, but before the limit level is reached.

DETAILED DESCRIPTION OF A PREFERRED EMBODIMENT OF THE INVENTION

Figure 1:
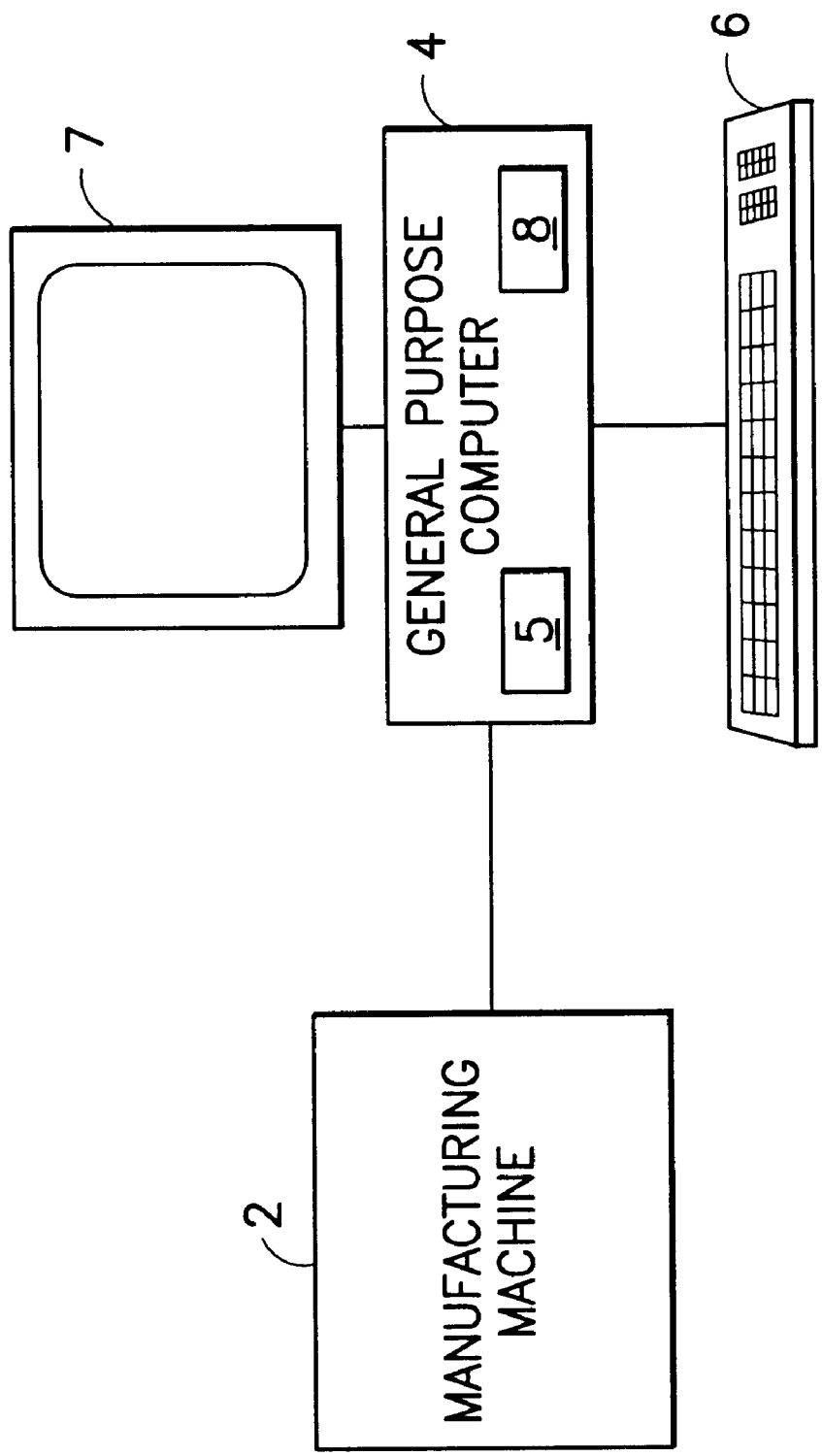
FIG. 1 is a block diagram of a general purpose computer and an automated manufacturing machine in accordance with the invention.

Referring now to FIG. 1, a block diagram is shown of a system in accordance with this invention. The system includes an automated manufacturing machine 2, such as a semiconductor manufacturing photolithography tool, controlled by a general purpose computer 4. The general purpose computer 4 includes a processor 5, a keyboard 6 and a monitor 7. The computer also includes a hard drive and various other drives 8 for receiving such items as CD ROMs and magnetic disc.

Figure 2:
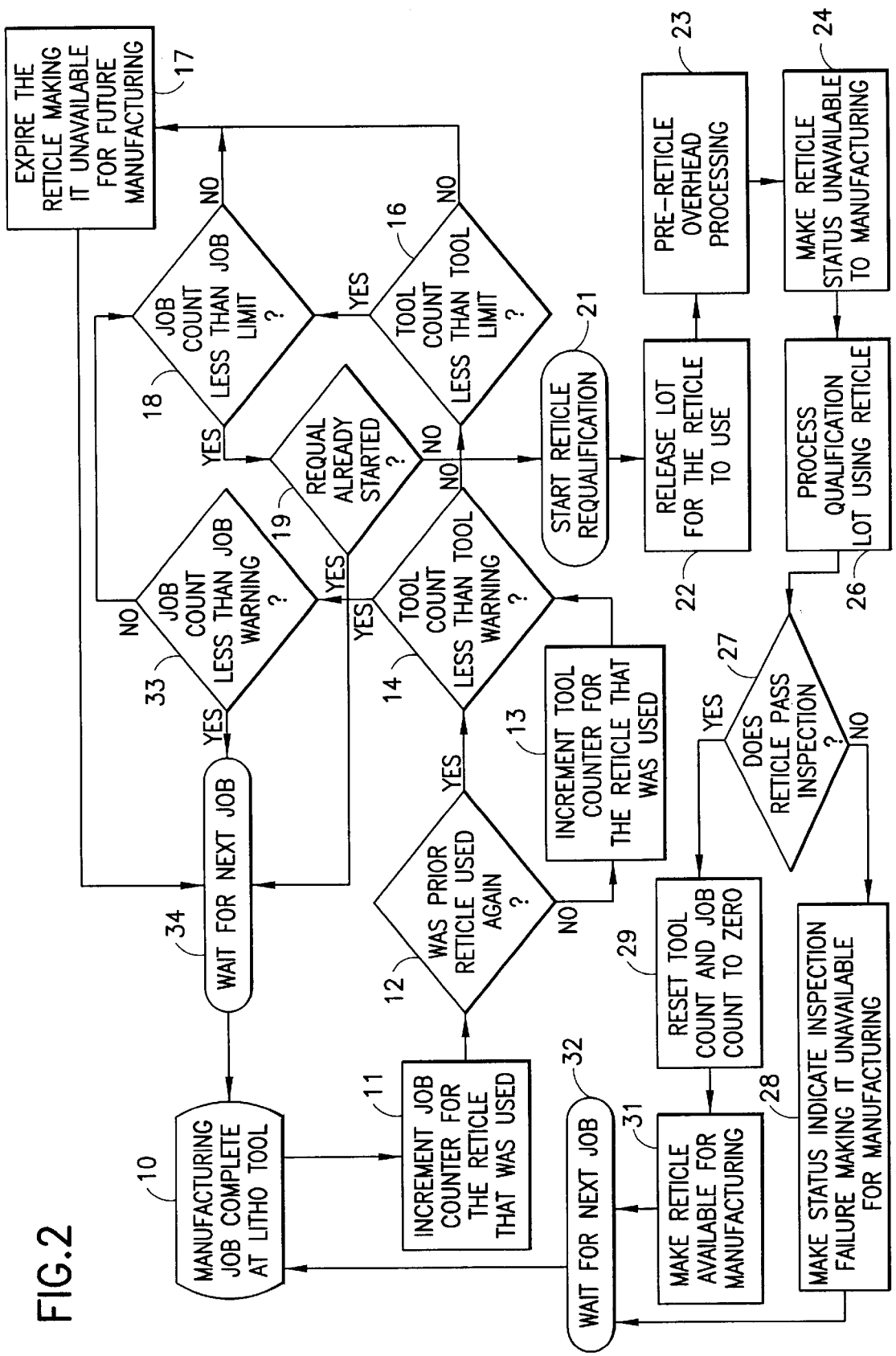
FIG. 2 is a logic flow diagram showing the logic used in the apparatus of FIG. 1.

Referring now to FIG. 2, a logical flow diagram is shown for a system which operates in accordance with this invention. The system of the logical flow diagram of FIG. 2 is implemented on the general purpose computer 4 and the automated manufacturing machine 2 of FIG. 1. In accordance with this invention, the general purpose computer 4 automatically activates the start of requalification of a durable manufacturing resource, such as a reticle, used in the semiconductor manufacturing photolithography tools. Such a reticle may need to be requalified after it is used in a first predetermined number of jobs or after it is used a second predetermined number of times.

The system of this invention employs two counters. The first counter is a job counter to keep track of how many jobs the reticle was used for, and the second counter is a tool counter which determines how many times the reticle was actually used, (i.e. taken from a storage location and placed in the tool). It should be noted that if a reticle is used for two successive jobs, it is only placed in the tool once. Each time a manufacturing job is completed at the litho tool (see Box 10), the job counter is incremented for the reticle that was used for that job (see Box 11). It is then determined whether the prior reticle was used again (see Box 12). If it was not, the tool counter is incremented for the reticle that was used at Box 13. This is so because, if the prior reticle was not used again, that means that a new reticle was used and, therefore, the tool counter for that new reticle needs to be incremented. If the prior reticle was used again, the tool counter is not incremented since there was no new use of any recticle in the tool.

In either event, it is next determined in Box 14 if the tool count is less than a pre-determined warning level. The pre-determined warning level is set at the level at which requalification of the reticle is to begin. If the tool count is not less than the warning level (meaning it is at or above the warning level), it is next determined in Box 16 if the tool count is less than a predetermined tool limit. If the tool count is not less than the tool limit, the recticle is rendered expired in Box 17, and is thus made unavailable for future manufacturing.

The reticle is likewise expired if the job limit has been reached for that reticle (Box 18). If neither the tool limit nor the job limit have been reached, but either the tool warning or job warning levels have been reached, it is then determined in Box 19 if requalification has already started. If not, requalification will begin in Box 21. This will trigger Box 22 to release a lot of wafers for use with the reticle during requalification. In most instances, this lot will be one wafer. However, any number of wafers can be used.

Next, in Box 23, pre-reticle overhead processing will be implemented.

It should be noted that the reticle needing requalification may continue in regular use during the pre-reticle overhead processing. Accordingly, after the requalification job is started, the tool counter and job counter may still be incremented. The reticle will not be actually removed from use until (1) the job or tool limits are reached or (2) the reticle is needed for processing the requalification job. Ideally, the reticle will be removed from regular use for requalification purposes just before the tool limit or job limit is reached.

In Box 24, the reticle status will be made unavailable to manufacturing and then process qualification with the lot will begin using the reticle in Box 26. It will be determined in Box 27 if the reticle passes inspection. If not, Box 28 will make the status of the reticle that it failed inspection and, thus, will be unavailable for manufacturing. If Box 27 indicates that the reticle passes inspection, both the tool count and the job count will be reset to zero in Box 29. In Box 31, the reticle will be made available again for manufacturing, and the system will wait for the next job to be processed.

Looking again at Box 14, it may be seen that if the tool count is less than the warning level, it is next determined if the job count is less than the job warning level, as shown in Box 33. If it is, the system rests and waits for the next job at Box 34. If the job count is not less than the job warning level, Box 18 is activated; and if the job count is less than the job limit (as it should be), requalification is started in Box 19 and the process as set forth above from Box 19 through Boxes 21, 22, 23, 24, 26, 27, 28, 29 and 31 is followed as described above.

In this embodiment of the invention, a system is provided which initiates the start of reticle requalification prior to the reticle expiring due to one or more event occurrences. In this way, the requalification occurs when it is needed, not at a predetermined time and, therefore, minimizes the number of requalifications and yet ensures that the durable resource, in this instance a reticle, is requalified as necessary.

While the invention has been described in terms of a specific embodiment, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

What is claimed is:

1. A system for controlling a time at which a durable item used in a manufacturing process, the utility of which expires after a first predetermined number of first events, is requalified for use, said system comprising:
   a first counter for counting occurrences of said first events to provide a first counter count;
   a device for determining if said first counter count exceeds a warning level;
   a device for determining if said first counter count is less than a limit level;
   a device for initiating a preparatory requalification activity while the durable item is still in use; and
   a requalification device for initiating requalification of said durable item whereby a time to complete the preparatory requalification activity is deducted from a total time the durable item is unavailable for use during requalification.

2. The system as defined in claim 1 also including:
   apparatus for using said durable item in said manufacturing process;
   apparatus for providing preparatory requalification activity materials; and
   apparatus for determining if said durable item is fit for further use.

3. The system as defined in claim 3 also including:
   apparatus, responsive to a determination that said durable item is fit for use, for resetting said first counter.

4. The system as defined in claim 1 in which said durable item also expires after a second predetermined number of second events said system also including:
   a second counter for counting the occurrences of said second events to provide a second counter count;
   a device for determining if said second counter count exceeds a second warning level; and
   a device for determining if said second counter count is less than a second limit level; wherein said device for initiating a preparatory requalification activity also initiates said preparatory requalification activity while the durable item is still in use and said requalification device also initiates requalification of said durable item, respectively, in accordance with said second counter count, when said second counter count exceeds the second warning level and is less than the second limit level.

5. The system as defined in claim 4 further comprising:
   apparatus for using said durable item in said manufacturing process; and
   apparatus for determining if said durable item is fit for further use.

6. The system as defined in claim 5 further comprising:
   apparatus, responsive to a determination that said durable item is fit for use, for resetting said first counter and second counter.

7. A method for controlling the time of requalification for use of a durable item used in a manufacturing process, wherein the utility of the durable item expires after a first predetermined number of first events, said method comprising the steps of:
   obtaining a first count of occurrences of said first events;
   determining if said first count exceeds a warning level;
   determining if said first count is less than a limit level;
   providing a device for initiating a preparatory requalification activity while the durable item is still in use; and
   providing a requalification device for initiating requalification of said durable item whereby a time to complete the preparatory requalification activity is deducted from a total time the durable item is unavailable for use during requalification.

8. The method of claim 7, further comprising the steps of:
   providing an apparatus for using said durable item in said manufacturing process;
   providing an apparatus for providing preparatory requalification activity materials; and
   determining if said durable item is fit for further use.

9. The process of claim 8, further comprising the step of providing an apparatus for resetting said first counter, said apparatus being responsive to a determination that said durable item is fit for use.

10. The process of claim 7, wherein said durable item also expires after a second predetermined number of second events, said process further comprising the steps of:
    providing a second counter for counting the occurrences of said second events to provide a second count;
    determining if said second count exceeds a second warning level;
    determining if said second count is less than a second limit level; and wherein said device for initiating a preparatory requalification activity also initiates said preparatory requalification activity while the durable item is still in use and said requalification device also initiates requalification of said durable item, respectively, in accordance with said second counter when said second count exceeds the second warning level and is less than the second limit level.

11. The process of claim 10, further comprising the steps of:

provifing an apparatus for using said durable item in said manufacturing process; and determining if said durable item is fit for further use.

12. The process of claim 11, further comprising the step of providing an apparatus, responsive to a determination that said durable item is fit for use, for resetting said first and second counters.

13. A computer readable storage medium having stored therein instructions for performing a method of controlling time of requalification for use of a durable item used in a manufacturing process, wherein the utility of the durable item expires after a first predetermined number of first events, as recited in claim 7.

14. A computer readable storage medium having stored therein instructions for performing a method of controlling time of requalification for use of a durable item used in a manufacturing process wherein the utility of the durable item expires after a first predetermined number of first events, as recited in claim 8.

15. A computer readable storage medium having stored therein instructions for performing a method of controlling a time at which the utility of requalification for use of a durable item used in a manufacturing process expires after a first predetermined number of first events, as recited in claim 9.

16. A computer readable storage medium having stored therein instructions for performing a method of controlling time of requalification for use of a durable item used in a manufacturing process expires after a first predetermined number of first events, as recited in claim 10.

17. A computer readable storage medium having stored therein instructions for performing a method of controlling time of requalification for use of a durable item used in a manufacturing process expires after a first predetermined number of first events, as recited in claim 11.

18. A computer readable storage medium having stored therein instructions for performing a method of controlling time for requalification for use of a durable item used in a manufacturing process expires after a first predetermined number of first events, as recited in claim 12.

* * * * *